July 23, 1968     F. A. WOOD ET AL     3,393,468

BIRD TRAP

Filed Oct. 18, 1965

INVENTOR.
FRED A. WOOD &
JOSEPH A. GORDON

BY Carl R. Brown

ATTORNEY

United States Patent Office 3,393,468
Patented July 23, 1968

3,393,468
BIRD TRAP
Fred A. Wood and Joseph A. Gordon, San Diego, Calif., assignors to Ketch-All Company, San Diego, Calif., a corporation of California
Filed Oct. 18, 1965, Ser. No. 497,095
6 Claims. (Cl. 43—66)

ABSTRACT OF THE DISCLOSURE

A bird trap having an opening at one end that is closed by a plurality of individually pivoting spoke members. The spoke members have double angled lower end portions for preventing trapped birds from raising the spoke members. The trap opening has a lower, plastic covered, plate member with slots having enlarged openings at the closed slot ends for receiving the spoke members in the closed position and preventing lateral movement of the spoke members.

Background of the invention

There are known box traps for trapping birds. These known traps are, in general, expensive to construct and yet are not capable of successfully enticing the free entry of birds into the trap and then preventing their departure therefrom. A successful bird trap requires that birds be free to enter the trap without becoming alarmed even though the trap may already have other birds therein. The trap can not have the same design as an animal trap where the animal enters the trap and then steps on a trip pan closing and locking a door in the entrance. While birds are not normally as dextrous as animals in opening the entrance to traps while trapped inside, still birds have certain abilities for opening entrance doors. Thus entrances to bird traps must be so constructed that birds in succession may freely enter the trap; and that the birds once in the trap can not escape when the trap entrance is open and admitting other birds into the trap. Further the entrance to the trap should be such that a bird inside the trap can not open the door for his escape or for the escape of others.

Therefore, it is an object of our invention to provide a new and improved bird trap.

It is another object of our invention to provide a new and improved, simplified, inexpensive and easy to construct bird trap.

It is another object of our invention to provide a new and improved bird box trap that is capable of successively trapping and holding a plurality of birds at one time.

It is another object of our invention to provide a new and improved bird trap having an entrance that does not alarm birds and yet prevents the exit of birds from the trap at the time other birds enter the trap or at other times.

To accomplish the foregoing objects and advantages of our invention an embodiment of our trap may comprise a wire enclosure having at least an entrance at one end. Feed or the like is spread on the ground within the trap and may be seen by birds outside the trap. The size of the entrance to the trap may be selectively set to catch the size of the bird desired. A plurality of spoke like members close the entrance of the trap like a curtain. The spoke members are all freely movable, individually, by entering birds. The birds may pass through the entrance by merely moving therethrough and causing those spokes contacted by the bird to be lifted and pivoted upward out of the birds way in entering the trap. Once the bird enters the trap then the spokes pivot downwardly to a position against the bottom of the entrance and in a substantially vertical position. This prevents the bird from moving back through the entrance and out of the trap, because the spokes won't pivot in the other direction. The spoke members have spacers between their individual upper pivotal connections and aligning apertures at the bottom of the entrance that hold the spokes in alignment. At their bottom ends, the spokes have angled end portions that further function to prevent the ends of the spokes from being raised or pushed sideways by birds that are attempting to escape from the trap.

The exact nature of our invention as well as other objects and advantages will be more readily apparent from consideration of the following specification relating to the drawing in which.

Figure 1:
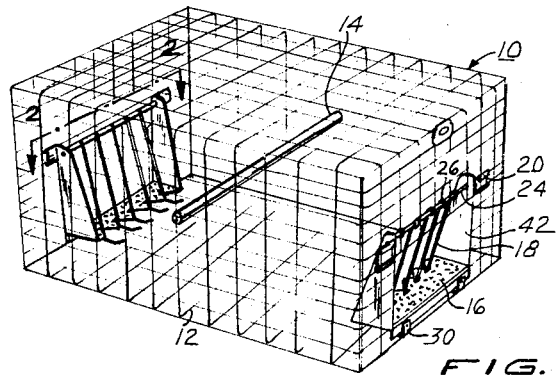
FIGURE 1 is a perspective view of an embodiment of our invention.

Referring now to FIGURE 1, the trap 10 comprises a rectangular, box-shaped enclosure that is constructed of heavy gage wire 12. While the trap 10 may be made of other material such as sheet metal, wood or the like, it has been found that heavy wire construction is inexpensive, easy to shape, light weight and yet strong enough to retain the birds trapped. Further the wire permits the birds to look through the trap and see other birds and the food therein and be enticed to enter the trap through one of the entrances. The trap 10 has a bar 14 positioned therein for birds to rest on when in the trap. This provides more space in the lower portion of the trap for the entry and occupancy by other birds.

Figure 2:
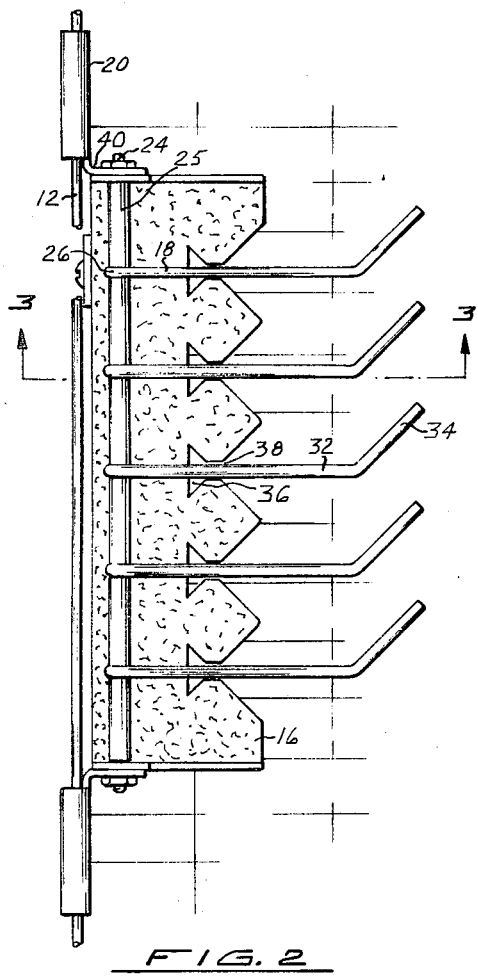
FIGURE 2 is a partial view taken along lines 2—2 of FIGURE 1 of the mechanism for closing the entrance of the trap in the specific embodiment of our invention.

The trap has entrances at both ends that are identical. The entrance has a square configuration with sheet metal side members 42. The side members 42 support a bottom entrance plate 16 that may be integral therewith and joined to the side members 42 by welding, soldering, fastening or the like. Plate member 16 has an L shape with the front angled portion supporting the remainder of the plate member by fitting over the wire 12 at the bottom side of the entrance and being secured to the bottom wire 12 of the trap by bracket 28. Bracket 28 is fastened to the angle portion by integral angle member 30. The top portion of the side members 42 are secured to the trap at a point adjacent the entrance by a rod 24 that passes through aligned apertures in the side members 42. The rod 24 and side members 42 are held to the wires 12 that form the upper edge of the trap by brackets 40 that have integral wire gripping portions 20 (see FIGURES 1 and 2).

Figure 3:
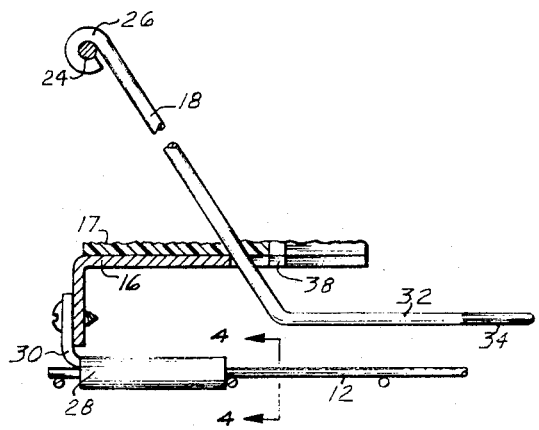
FIGURE 3 is a view taken along lines 3—3 of FIGURE 2 that is partly in section and partly broken away.
Figure 4:
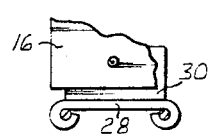
FIGURE 4 is a view taken along lines 4—4 of FIGURE 3.

Pivotally suspended from rod 24 are a plurality of spoke-like members 26 that are made of wire and that have hooked eye portions for hooking over rod 24 as shown in FIGURE 3. The spoke members 18 freely pivot around rod 24. Tubular spacers 25 are slipped on rod 24 and fit between the spokes 18 thereby holding the spokes in given spaced positions along rod 24. The spacers 25 have a sufficiently large cross-section, relative to the size of the hook end 26 of spoke 18, to provide considerable lateral support to the spokes 18. The lower ends of spokes 18 rest on the edge of the plate 16. Plate 16 has a plurality of recesses in the edge thereof that form slots for receiving the lower portion of the spokes 18. The slots have a narrow entrance slot 38 and a triangular shaped volume 36. The spoke member when moved by gravity into passage 38 will be guided or cammed into the passage by the inwardly angled outer edges 37. Once the spoke member is in triangular slot 36 when the spoke member is not able to move out of slot 36 without passing through the narrowed space 38. If the spoke 18 is out of alignment and in one corner of triangular space 36 then the spoke member 18 will be cammed or guided toward slot 38 by the angled edges of slot 36. Thus it may be seen that when the spoke members 18 are in triangular slots 36, the lower end may not be moved in a direction parallel to the entrance of the trap. However, the spokes may be pivoted around rod 24, if force is applied to the lower end of spoke member 18 in a direction toward entry into the trap.

The lower portion of the spoke member 18 has a flat portion 32 that, when the spoke member 18 is against the back of triangular slot 36, lays substantially horizontal or parallel with the floor of the trap 10. Approximately midway the length of the flat portion 32, the portion bends in an oblique direction at about a 45 degree angle to the entrance of the trap. This angled portion 34 is also substantially horizontal or level with the floor of the trap when spoke 18 is in the back of the slot 36. This flat 32 and angled portion 34 aid in preventing movement of birds out of the trap through the spokes 18 in a manner that will be more specifically described hereinafter.

*Operation*

In operation, birds outside the trap see other birds within the trap eating the food that may be spread on the ground in the trap. The birds then move to enter the trap through the entrance. The birds walk over plate 16 and through the swinging spokes 18 that freely pivot upwardly around supporting rod 24 and in a direction along the longitudinal length of the trap. The spokes are held in that pivotal direction by spacers 25. After the bird enters the trap, the spokes 18 then fall back into their position in slot 36. The bird is then unable to escape from the trap.

Usually the way birds escape from a trap having a spoke entrance such as forms a part of our invention, is by the birds leaving through the entrance. The birds will thrust their head and neck between the spokes 18 and force them laterally allowing the bird to pass therebetween. In our invention, when a bird attempts this, the spokes 18 will not move laterally because the spokes 18 are held by spacers 25 at their upper end and by the sides of the triangles 36 at their lower end. After the birds have thrust their necks between the spokes 18 and find they cannot squeeze through, they then move backwards and their feathers catch on the spokes 18 and raise the spokes. This permits the bird to raise the spokes to a fairly high pivoted position in which, if the bird itself cannot escape, then other birds can escape underneath the bird that has hooked onto the spokes 18. However, in our invention when the bird moves backward with the spokes 18 hooked onto the bird's feathers, flat portion 32 and the lateral portion 34 hits the bird's body and prevents any further upward pivotal movement of the spokes 18. Thus the bird pulls away from the spokes 18 with ruffled feathers. Also other birds walk on the ends 32 and 34 and thus prevent their vertical movement.

Birds will not normally move over a shiny surface such as a sheet metal plate. However entrance plate 16 has a covering of plastic or the like 17 that resembles in color and texture surroundings more familiar to the birds. Many times it is advisable to place the lower surface of the trap in dirt or the like, thus disguising the lower portion of the trap and making the feed lay on a surface more familiar to birds. To facilitate this, the flat portion of spokes 32 and plate 16 may be appropriately spaced from the bottom of the trap as shown in FIGURE 3.

Various modifications are contemplated and may obviously be resorted to by those skilled in the art without departing from the spirit and scope of our invention as defined by the appended claims.

We claim:
1. A bird trap comprising,
an enclosure having an opening at one end,
a plurality of spoke members supported inside said trap for individual pivotal movement to open and close said opening,
a plate positioned adjacent the bottom of said opening having slots therein for individually receiving the lower ends of said members and preventing their movement outside said trap or laterally to the direction of said pivotal movement,
said lower ends of said spoke members having angled portions angled in a direction substantially horizontal to the floor of said trap when said spoke members are in the position of closing said opening,
and end portions of said angled portions of said members being bent at an angle to the direction of said pivotal movement of said members.
2. A bird trap as claimed in claim 1 in which,
said end portions being in the same plane as said angled portions.
3. A bird trap as claimed in claim 2 in which,
said end portions being at an acute angle to the direction of said pivotal movement of said spoke members.
4. A bird trap as claimed in claim 3 in which,
said end portions and said angled portions being positioned adjacent the floor of said trap and below said plate when said spoke members are in position to close said opening.
5. A bird trap as claimed in claim 4 in which,
each of said slots having an open end and a closed end with a narrowed neck portion midway its length,
and the end portion of said slot between said narrowed neck portion and said closed end having an opening that is wider than the width of said neck portion.
6. A bird trap as claimed in claim 5 in which,
said end portion of said slot having side surfaces that diverge outwardly from said neck portion to said closed end.

References Cited

UNITED STATES PATENTS

| 128,802 | 7/1872 | Lampkin | 43—66 |
| 986,977 | 3/1911 | Harris | 43—66 |
| 1,363,626 | 12/1920 | Thomas | 43—66 |
| 2,693,050 | 11/1954 | Neid | 43—66 |

FOREIGN PATENTS

| 1,687,758 | 3/1906 | Germany. |
| 4,285 | 1898 | Great Britain. |